(12) United States Patent
Jin

(10) Patent No.: US 11,086,799 B2
(45) Date of Patent: Aug. 10, 2021

(54) METHOD AND DEVICE FOR CONFIGURING CONTROLLER IN MASTER CONTROL CHIP

(71) Applicant: BEIJING XIAOMI MOBILE SOFTWARE CO., LTD., Beijing (CN)

(72) Inventor: Tao Jin, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/688,867

(22) Filed: Nov. 19, 2019

(65) Prior Publication Data

US 2020/0364160 A1 Nov. 19, 2020

(30) Foreign Application Priority Data

May 16, 2019 (CN) .......................... 201910411484.1

(51) Int. Cl.
*G06F 3/00* (2006.01)
*G06F 13/10* (2006.01)

(52) U.S. Cl.
CPC ........ *G06F 13/102* (2013.01); *G06F 2213/40* (2013.01)

(58) Field of Classification Search
CPC ..... G06F 13/00; G06F 13/102; G06F 2213/40
(Continued)

(56) References Cited

U.S. PATENT DOCUMENTS

| 5,430,707 A | 7/1995 | Eduard |
| 2011/0179193 A1 | 7/2011 | Kuehm |

(Continued)

FOREIGN PATENT DOCUMENTS

| CN | 104732979 A | 6/2015 |
| CN | 105611222 A | 5/2016 |

(Continued)

OTHER PUBLICATIONS

"TMS320C5515/14/05/04 DSP Inter-IC Sound (I2S) Bus User's Guide", May 31, 2014(May 31, 2014), XP055244134, Dallas, Texas Retrieved from the Internet: URL: http://www.ti.com/lit/ug/sprufx4b/sprufx4b.pdf [retrieved on Jan. 22, 2016] * abstract * * p. 5, lines 2,3 * * pp. 11,12*.

(Continued)

*Primary Examiner* — Brian T Misiura
*Assistant Examiner* — Kim T Huynh
(74) *Attorney, Agent, or Firm* — Syncoda LLC; Feng Ma

(57) ABSTRACT

A method for configuring a controller in a master control chip can include operations such as: a controller is configured according to a sampling rate, a bit width occupied by data transmission of at least one peripheral and the number of the at least one peripheral plugged into an interface corresponding to the controller; and data transmitted by the at least one peripheral plugged into the interface is received through the configured controller. A configuration parameter of the controller is reconfigured, and then the peripheral may be connected to the interface at timing generated by the controller and the data transmitted by the at least one peripheral is acquired, thereby increasing the types of peripherals supported by the master control chip, and increasing the number of peripherals that can be plugged into the master control chip.

20 Claims, 16 Drawing Sheets

(58) Field of Classification Search
USPC .......................................... 710/8, 25, 29, 61
See application file for complete search history.

(56) References Cited

U.S. PATENT DOCUMENTS

| | | | | |
|---|---|---|---|---|
| 2014/0208126 A1* | 7/2014 | Mooney | ................ | G06F 1/3215 |
| | | | | 713/300 |
| 2019/0005974 A1* | 1/2019 | Hariharan | ............ | G06F 13/4273 |
| 2019/0018467 A1* | 1/2019 | Patterson | ................ | G06F 1/266 |

FOREIGN PATENT DOCUMENTS

| | | |
|---|---|---|
| CN | 106911987 A | 6/2017 |
| CN | 107889001 A | 4/2018 |

OTHER PUBLICATIONS

Supplementary European Search Report in the European application No. 19211587.1, dated May 12, 2020.
First Office Action of the Chinese application No. 201910411484.1, dated Jun. 8, 2020.
Notice of Allowance of the China application No. 201910411484.1, dated Mar. 8, 2021.

* cited by examiner

METHOD AND DEVICE FOR CONFIGURING CONTROLLER IN MASTER CONTROL CHIP

CROSS-REFERENCE TO RELATED APPLICATION

This application claims priority to Chinese patent application No. 201910411484.1 filed on May 16, 2019, the disclosure of which is hereby incorporated by reference in its entirety.

BACKGROUND

A master control chip, which is a core component of a main board or a hard disk, is a bridge for connecting each device and also a brain for controlling a device to run and work. At present, many master control chips have external interfaces for preset peripherals for being plugged into. During use, the preset peripherals are only required to be plugged into the external interfaces of the master control chips.

SUMMARY

The present disclosure generally relates to the technical field of communications, and more particularly, to a method and device for configuring a controller in a master control chip.

This summary is provided to introduce a selection of aspects of the present disclosure in a simplified form that are further described below in the Detailed Description. This summary is not intended to identify key features or essential features of the claimed subject matter, nor is it intended to be used to limit the scope of the claimed subject matter.

According to a first aspect of the embodiments of the present disclosure, a method for configuring a controller in a master control chip is provided, which may include that:

a controller is configured according to a sampling rate, a bit width occupied by data transmission of at least one peripheral and the number of the at least one peripheral plugged into an interface corresponding to the controller; and data transmitted by the at least one peripheral plugged into the interface is received through the configured controller.

In an embodiment, the operation that the controller is configured according to the sampling rate, the bit width occupied by data transmission of the at least one peripheral and the number of the at least one peripheral plugged into the interface corresponding to the controller may include that:

a clock frequency of a bit Synchronization (SYN) clock of the controller is acquired according to the sampling rate, the bit width and the number of the at least one peripheral; and the bit SYN clock is configured according to the clock frequency of the bit SYN clock.

In an embodiment, the operation that the controller is configured according to the sampling rate, the bit width occupied by data transmission of the at least one peripheral and the number of the at least one peripheral plugged into the interface corresponding to the controller may include that:

a clock cycle of the bit SYN clock is acquired according to the clock frequency of the bit SYN clock;

a high pulse duration of a frame SYN clock of the controller is acquired according to the clock cycle of the bit SYN clock;

a clock frequency of the frame SYN clock of the controller is acquired according to the sampling rate; and the frame SYN clock is configured according to the high pulse duration of the frame SYN clock and the clock frequency of the frame SYN clock.

In an embodiment, the operation that the controller is configured according to the sampling rate, the bit width occupied by data transmission of the at least one peripheral and the number of the at least one peripheral plugged into the interface corresponding to the controller may include that:

a bit-width parameter of the controller is configured according to the bit width occupied by data transmission of the peripheral.

In an embodiment, the operation that the controller is configured according to the sampling rate, the bit width occupied by data transmission of the at least one peripheral and the number of the at least one peripheral plugged into the interface corresponding to the controller may include that:

a parameter of the number of a sound track of the controller is configured according to the number of the at least one peripheral plugged into the interface.

In an embodiment, the method may further include that:

the controller is controlled to generate the frame SYN clock and the bit SYN clock.

In an embodiment, the controller may include a Pulse Code Modulation (PCM) controller; and the peripheral may include a Time Division Multiplexing (TDM) device.

According to a second aspect of the embodiments of the present disclosure, a device for configuring a controller in a master control chip is provided, which may include:

the master control chip and N cascaded peripherals, N being a positive integer more than or equal to 1, wherein a frame SYN clock pin in the master control chip may be connected with a wakeup signal pin of a first-stage peripheral, the first-stage peripheral being one of the N peripherals;

a bit SYN clock pin in the master control chip may be connected with a bit SYN signal pin of the first-stage peripheral; and an audio data transmission pin in the master control chip may be connected with a data transmission pin of the first-stage peripheral.

According to a third aspect of the embodiments of the present disclosure, a device for configuring a controller in a master control chip is provided, which may include:

a processor; and a memory configured to store an instruction executable by the processor, wherein the processor may be configured to:

configure a controller according to a sampling rate, a bit width occupied by data transmission of at least one peripheral and the number of the at least one peripheral plugged into an interface corresponding to the controller; and control a transceiver to receive data transmitted by the at least one peripheral plugged into the interface through the configured controller.

According to a fourth aspect of the embodiments of the present disclosure, a computer-readable storage medium is provided, which have stored a computer instruction thereon, the instruction when executed by a processor, enabling the processor to implement the operations of any method in the first aspect.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
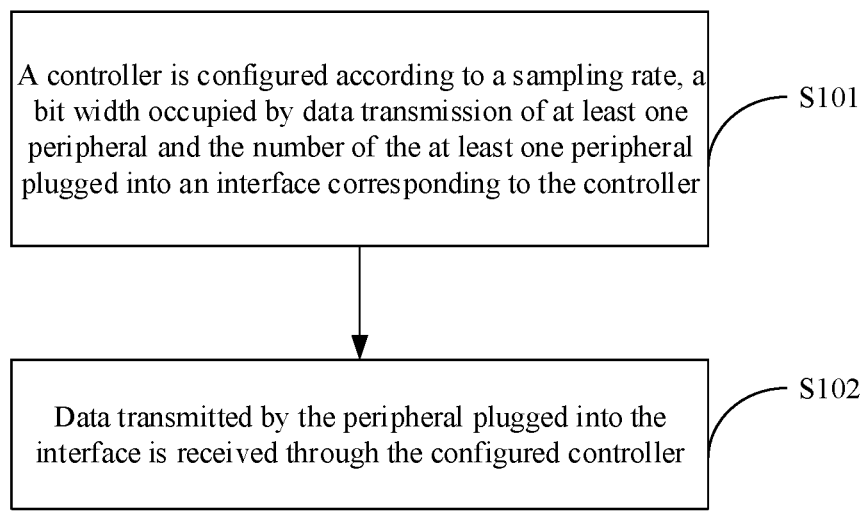
FIG. 1 is a flowchart illustrating a method for configuring a controller in a master control chip according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects associated with the present disclosure as recited in the appended claims.

Terms used in the present disclosure are only adopted for the purpose of describing specific embodiments but not intended to limit the present disclosure. It is also to be understood that term "and/or" used in the present disclosure refers to and includes one or any or all possible combinations of multiple associated items that are listed.

It is to be understood that "first", "second" and similar terms used in the specification and claims of the present application are not to represent any sequence, number or importance but only to distinguish different parts. Likewise, similar terms such as "a/an" and "the" as well as the plurality form do not represent a number limit but represent "at least one". Terms like "include" or "comprise" refer to that an element or object appearing before "include" or "comprise" covers an element or object and equivalent thereof listed after "include" or "comprise" and does not exclude another element or object.

Many master control chips have external interfaces for preset peripherals to be plugged in. During use, the preset peripherals are required to be plugged into the external interfaces of the master control chip only. However, the type of existing external interfaces in master control chips is undiversified, which cannot flexibly support plugging of peripherals of other types. For example, an external interface only supports plugging of a peripheral of a first type while cannot support plugging of a peripheral of a second type.

Various embodiments of the present disclosure can provide a method for achieving compatibility between a transmission protocol of an external interface and transmission protocols of other peripherals, so that the types of peripherals supported by a master control chip may be extended.

For example, for connecting multiple sound recording devices, it is usually necessary to use a fixed audio transmission protocol, such as an Inter-Integrated Circuit Sound (I2S) protocol. The I2S protocol is a bus standard that is set by Philips for audio data transmission between digital audio devices, and the bus is dedicated to data transmission between audio devices. However, according to the I2S protocol, a single data line can be used for transmitting dual-track audio data only, and for transmission of audio data of more sound tracks, more data lines are needed, so that the number of occupied pins of a master control chip may be increased, and complexity and cost of circuit wiring may also be increased.

However, a Time Division Multiplexing (TDM) transmission protocol has the characteristics that only a few pins are occupied, many devices can be cascaded and multiple devices multiplex a data line in a time division manner. Therefore, multiple external TDM devices, for example, TDM Digital Microphones (DMICs), may be simply connected with a master control chip through the TDM transmission protocol so as to transmit more sound tracks without additionally using more pins in the master control chip.

At present, there are few master control chips with TDM interfaces, however, many master control chips have Pulse Code Modulation (PCM) transmission interfaces. Accordingly, the present disclosure may provide a method for achieving compatibility between a PCM transmission protocol and a TDM transmission protocol, so that the types of peripherals capable of being supported by a master control chip may be extended. In some scenarios, for example, a master control chip is connected with an external TDM DMIC array, the method of the present disclosure may be used.

FIG. 1 is a flowchart illustrating a method for configuring a controller in a master control chip according to some embodiments of the present disclosure. As shown in FIG. 1, the method includes the following operations S101 to S102.

In operation S101, a controller is configured according to a sampling rate, a bit width occupied by data transmission of at least one peripheral and the number of the at least one peripheral plugged into an interface corresponding to the controller.

In operation S102, data transmitted by the at least one peripheral plugged into the interface is received through the configured controller.

For describing the concept of the present disclosure clearly, descriptions will be made below with the condition that the controller includes a PCM controller and the peripheral includes a TDM device as an example. It is to be noted that, in a practical application, the controller and the peripheral may also be of other types.

The master control chip may usually be integrated with a PCM protocol controller for connecting with an external PCM device.

PCM transmission timings in some situations are shown in FIG. 2A, FIG. 2B, FIG. 2C, and FIG. 2D.

Figure 2A:
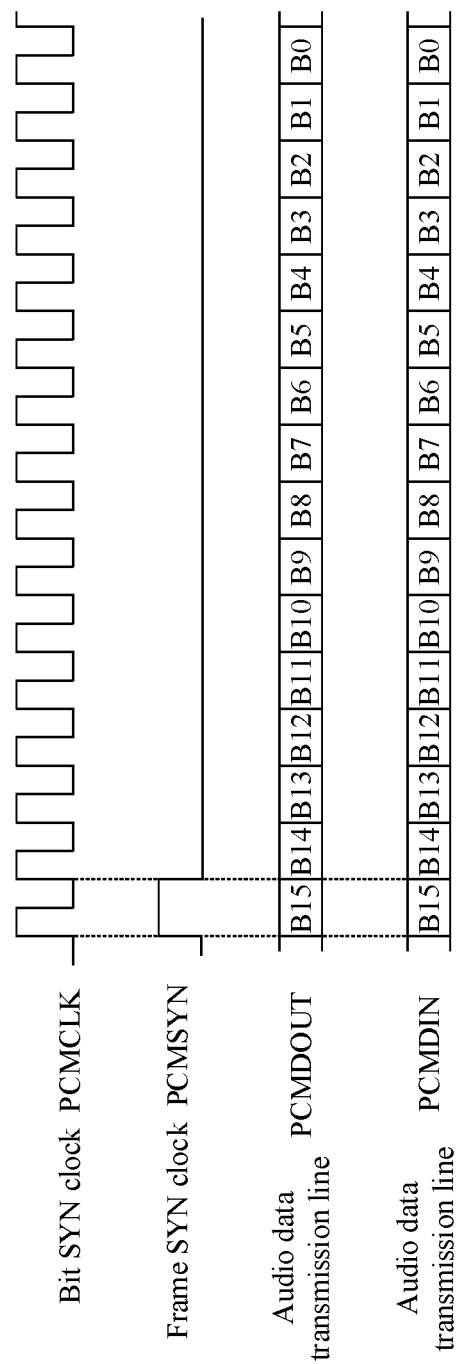
FIG. 2A is a schematic transmission timing diagram illustrating Short Frame SYN Timing according to embodiment 1.
Figure 2B:
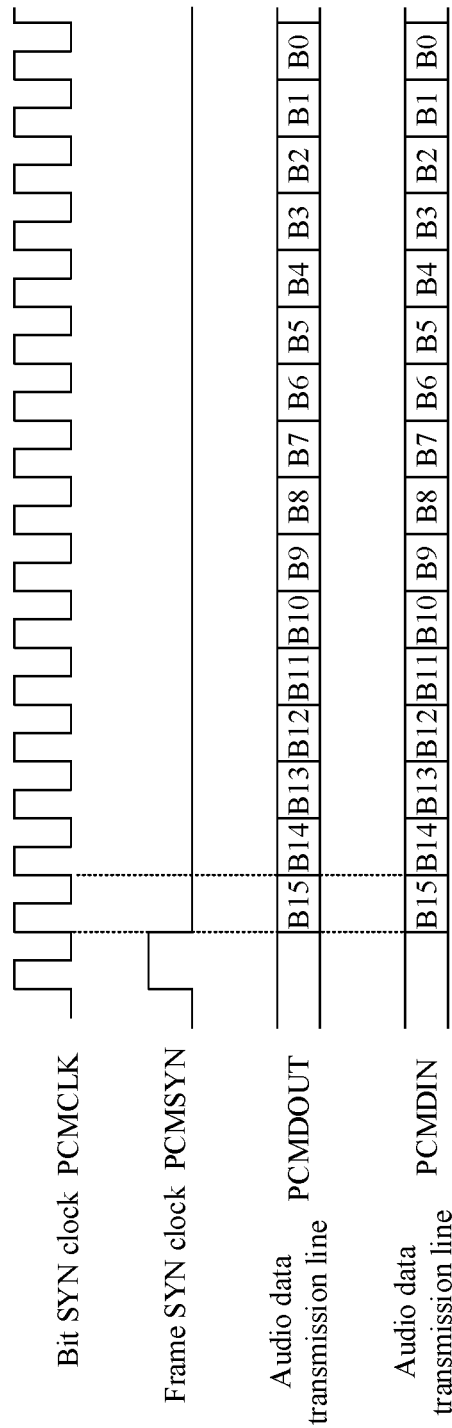
FIG. 2B is a schematic transmission timing diagram illustrating Short Frame SYN Timing according to embodiment 2.
Figure 2C:
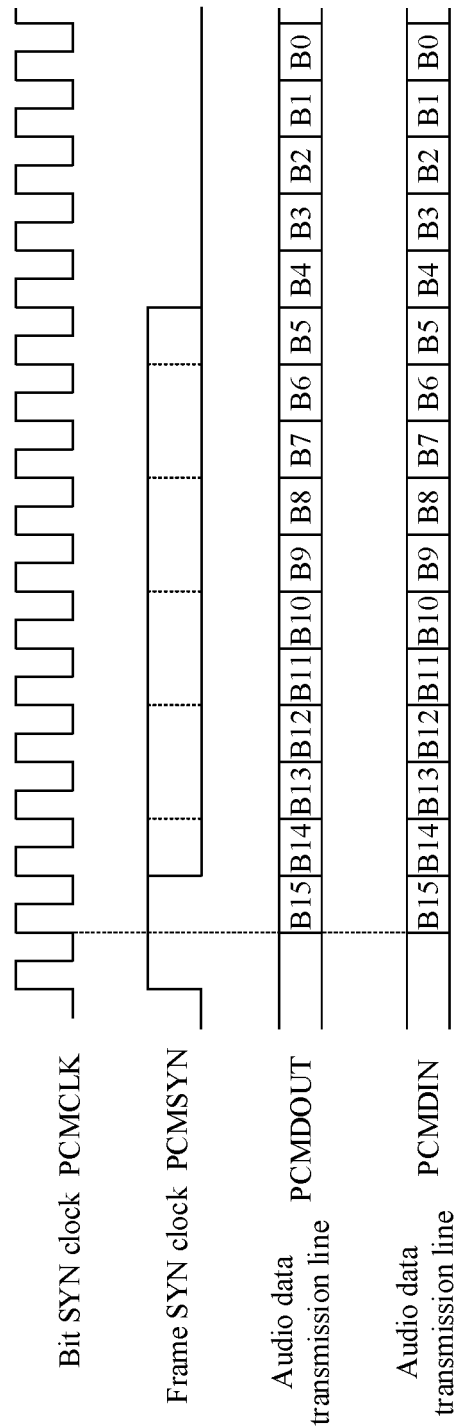
FIG. 2C is a schematic transmission timing diagram illustrating Long Frame SYN Timing according to embodiment 1.
Figure 2D:
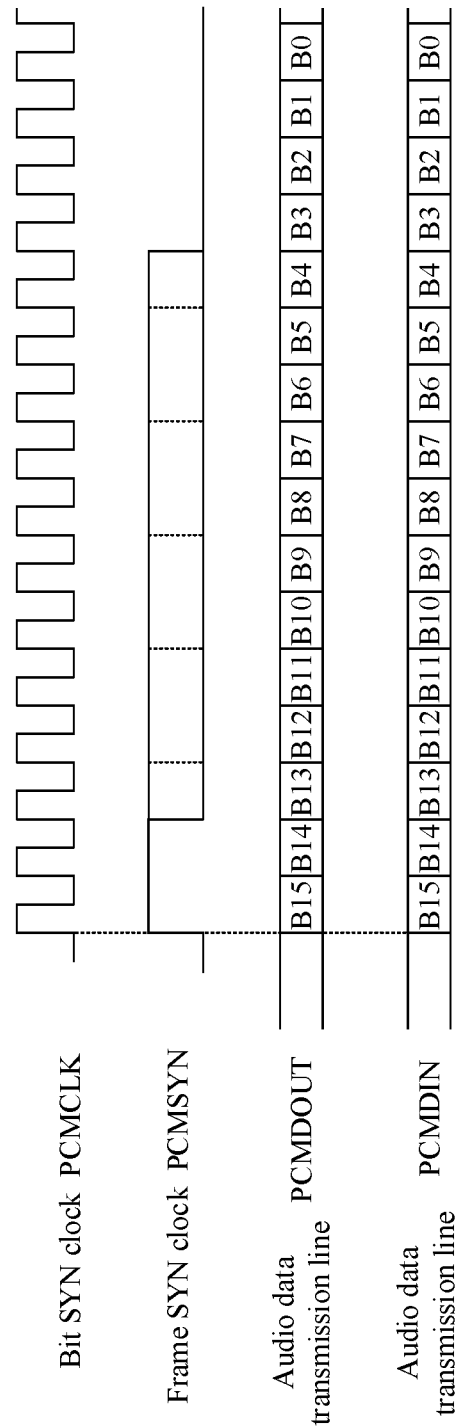
FIG. 2D is a schematic transmission timing diagram illustrating Long Frame SYN Timing according to embodiment 2.

FIG. 2A is a schematic transmission timing diagram illustrating Short Frame SYN Timing according to embodiment 1. FIG. 2B is a schematic transmission timing diagram illustrating Short Frame SYN Timing according to embodiment 2. FIG. 2C is a schematic transmission timing diagram illustrating Long Frame SYN Timing according to embodiment 1. FIG. 2D is a schematic transmission timing diagram illustrating Long Frame SYN Timing according to embodiment 2. In FIG. 2A to FIG. 2D, descriptions are made with the condition that a bit width is 16 bit as an example, and each of B0 to B15 represents one bit. PCMCLK is a pin corresponding to a bit synchronization (SYN) clock (also called a bit SYN clock pin). PCMSYN is a pin corresponding to a frame SYN clock (also called a frame SYN clock pin). PCMDOUT and PCMDIN are pins corresponding to audio data transmission lines (also called audio data transmission pins). The PCMDOUT is a pin corresponding to an audio data output line (also called an audio data output pin), and the PCMDIN is a pin corresponding to an audio data input line (also called an audio data input pin). Every time when PCMCLK vibrates for a cycle, a bit of data is transmitted on PCMDIN and PCMDOUT. Every time when PCMSYN vibrates for a cycle, a frame of data is transmitted.

Figure 3:
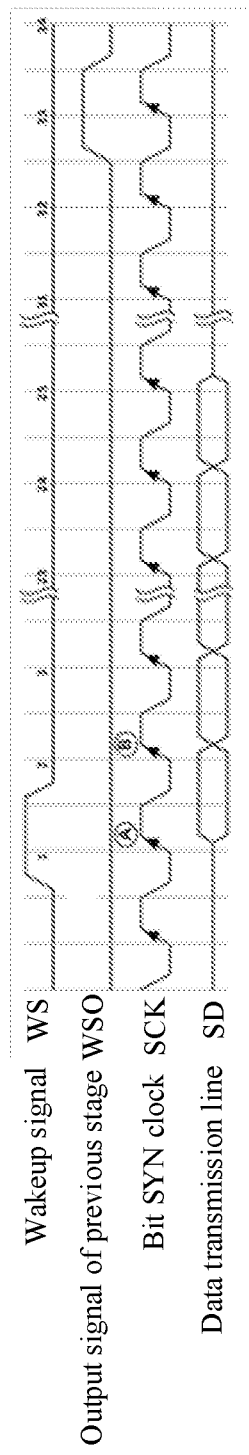
FIG. 3 is a schematic diagram illustrating TDM transmission timing according to embodiment 2.

TDM transmission timing in an implementation is shown in FIG. 3.

WS is a pin corresponding to a wakeup signal input by the TDM device (also called a wakeup signal pin), WSO represents an output signal for waking up a TDM device of a next stage after a TDM device of a previous stage completes transmitting one slot (also called a data transmission completion indication signal pin), SCK is a pin corresponding to a bit SYN signal (also called a bit SYN signal pin), and SD is a pin corresponding to a data transmission line (also called a data transmission pin).

The present-stage TDM device, after receiving the WS which has a high-level pulse, may occupy a SD data transmission line to transmit one frame of data presently acquired by the present-stage TDM device, the one frame of data also being called one slot. WSO of a previous-stage device is required to be connected with the WS of a next-stage device. Every time when SCK vibrates for a cycle, a bit of data is transmitted on the SD data line.

Different TDM devices may have different slot bit widths. Descriptions will be made in FIG. 3 with a slot bit width being 32 as an example. In such a case, SCK is n×32×fs, where n is the number of cascading stages of the present-stage TDM device and fs is the sampling rate.

It can be seen from FIG. 2A through FIG. 3 that the TDM transmission timing is substantially the same as the PCM Short Frame SYN Timing.

That is, WS in the TDM timing diagram is equivalent to PCMSYN in the PCM timing diagram. SCK in the TDM timing diagram is equivalent to PCMCLK in the PCM timing diagram. SD in the TDM timing diagram is equivalent to PCMDIN and/or PCMDOUT in the PCM timing diagram. WSO in the TDM timing diagram is a signal transmitted to a next-stage TDM device from a previous-stage TDM device, and is not required to correspond to the PCM timing. TDM devices are connected together stage by stage.

At present, many master control chips have PCM interfaces, but most of them do not have TDM interfaces. Since transmission timing of the PCM transmission protocol and that of the TDM transmission protocol are substantially the same in the abovementioned special scenario, the TDM devices may be connected through PCM interfaces.

Accordingly, the types of peripherals supported by the master control chip may be extended. In some scenarios, for example, when the master control chip is connected with an external TDM DMIC array, the technical solution of the present disclosure may be used, thereby avoiding additional use of more pins in the master control chip and avoiding increased complexity and cost of circuit wiring.

A configuration parameter of new PCM timing (timing for connecting a TDM device) generated by the PCM controller may be associated with a sampling rate, a bit width occupied by data transmission of at least one TDM device and the number of the at least one TDM device plugged into the PCM interface corresponding to the PCM controller. Therefore, the PCM controller is configured according to the sampling rate, the bit width occupied by data transmission of the at least one TDM device and the number of the at least one TDM device plugged into the corresponding PCM interface corresponding to the PCM controller, and the at least one TDM device may be connected to the PCM interface at the PCM timing generated by the PCM controller and the data transmitted by the at least one TDM device may be acquired.

Various embodiments of the present disclosure can have one of more of the following advantages. A controller is configured according to a sampling rate, a bit width occupied by data transmission of a peripheral and the number of the peripheral plugged into an interface corresponding to the controller, and the data transmitted by the at least one peripheral plugged into the interface is received through the configured controller. A configuration parameter of the controller is reconfigured, and then the peripheral may be connected to the interface at the timing generated by the controller and the data transmitted by the at least one peripheral may be acquired, so that the types of the peripheral supported by the master control chip may be extended, and the number of the at least one peripheral that may be plugged into the master control chip is effectively increased.

In an embodiment, the operation S101 may include the following sub-operations A1-A2.

In sub-operation A1, a clock frequency of a bit SYN clock of the controller is acquired according to the sampling rate, the bit width and the number of the at least one peripheral.

In sub-operation A2, the bit SYN clock is configured according to the clock frequency.

Exemplarily, it is set that the clock frequency of the bit SYN clock of the controller=the bit width*the number of cascaded peripheral*the sampling rate. The clock frequency of the bit SYN clock is calculated through the formula, and the bit SYN clock is further configured based on the calculated clock frequency.

In an embodiment, the operation S101 may include the following sub-operations B1-B4.

In sub-operation B1, a clock cycle of the bit SYN clock is acquired according to the clock frequency of the bit SYN clock.

In sub-operation B2, a high pulse duration of a frame SYN clock of the controller is acquired according to the clock cycle of the bit SYN clock.

In sub-operation B3, a clock frequency of the frame SYN clock of the controller is acquired according to the sampling rate.

It is set that the clock frequency of the frame SYN clock of the controller=the sampling rate, i.e., the number of frames of data sampled per second.

In sub-operation B4, the frame SYN clock is configured according to the high pulse duration of the frame SYN clock and the clock frequency of the frame SYN clock.

Transmission timing of the peripheral may be the same as transmission timing of the controller in some specific scenarios, and in such a case, the high pulse duration of the frame SYN clock is associated with the clock frequency of the frame SYN clock in the specific scenarios, so that it is necessary to configure the frame SYN clock according to the high pulse duration of the frame SYN clock and the clock frequency of the frame SYN clock.

In an embodiment, the operation S101 may include the following sub-operation that:

a bit-width parameter of the controller is configured according to the bit width occupied by data transmission of the at least one peripheral.

The bit width of the controller is set to be a bit width occupied by data transmission of one peripheral.

In an embodiment, the operation S101 may include the following sub-operation that:

a parameter of the number of a sound track of the controller is configured according to the number of the at least one peripheral plugged into the interface.

It is set that the sound track number of the controller=the number of the cascaded peripherals.

In an embodiment, the peripheral may not generate a clock signal by itself, and thus the method may further include that:

the controller is controlled to generate the frame SYN clock and the bit SYN clock.

A preset clock mode of the controller is set, under which the controller generates the bit SYN clock and the frame SYN clock by itself for the peripheral to use.

An embodiment of the present disclosure also provides a device for configuring a controller in a master control chip, which includes:

a master control chip and N cascaded peripherals, N being a positive integer more than or equal to 1, wherein a frame SYN clock pin in the master control chip is connected with a wakeup signal pin of a first-stage peripheral, the first-stage peripheral being one of the N peripherals;

a bit SYN clock pin in the master control chip is connected with a bit SYN signal pin of the first-stage peripheral; and an audio data transmission pin in the master control chip is connected with a data transmission pin of the first-stage peripheral.

When the audio data transmission pin in the master control chip includes an audio data output pin, the audio data output pin in the master control chip is connected with a data input pin of the first-stage peripheral.

When the audio data transmission pin in the master control chip includes an audio data input pin, the audio data input pin in the master control chip is connected with a data output pin of the first-stage peripheral.

In an implementation mode, for the N cascaded peripherals, a data transmission completion indication signal pin of a peripheral is connected with a wakeup signal pin of a next-stage peripheral;

a bit SYN signal pin of the peripheral of each stage is connected with the bit SYN clock pin in the master control chip; and a data transmission pin of the peripheral of each stage may be connected with a data transmission pin in the master control chip.

Figure 4:
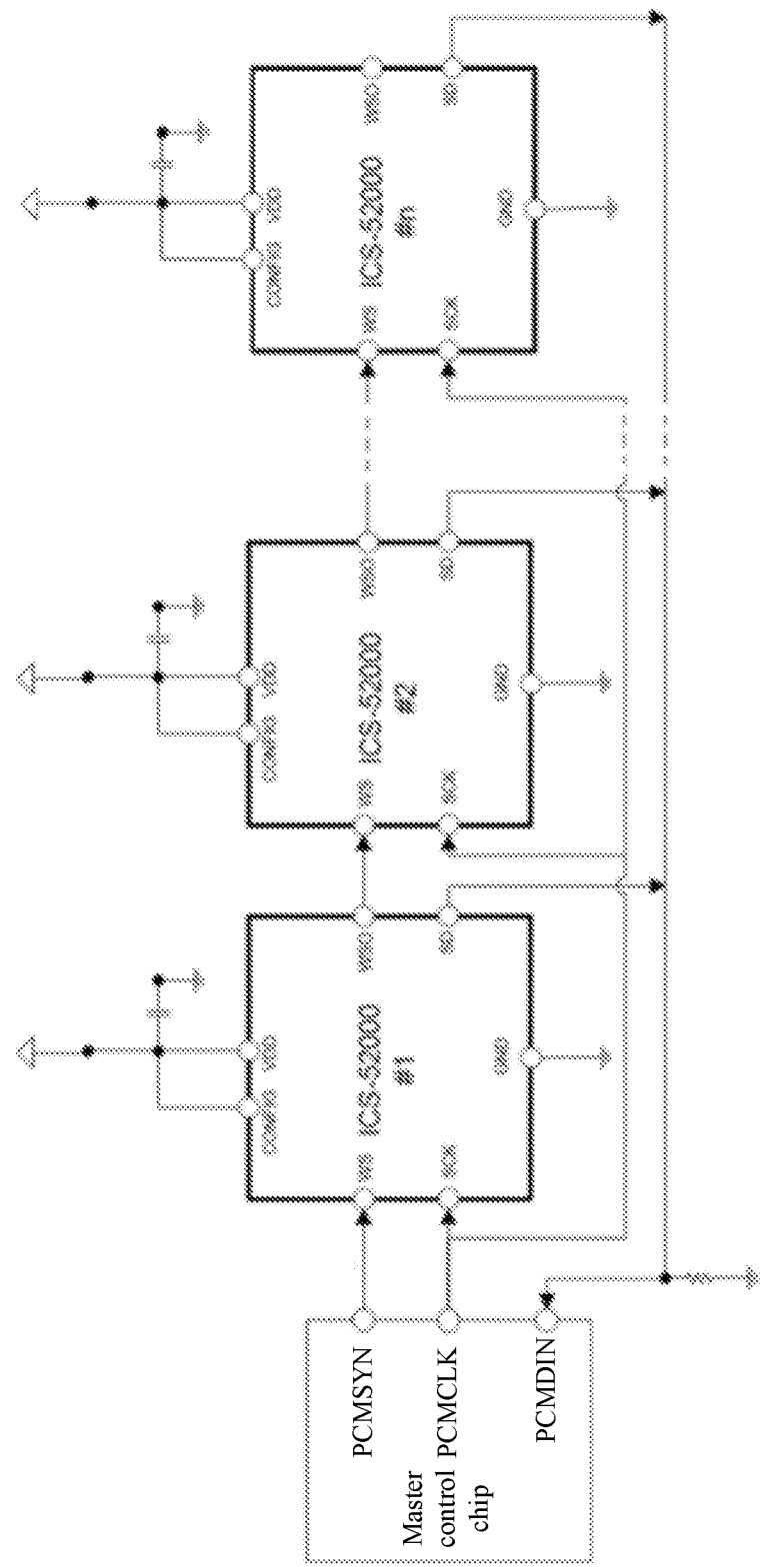
FIG. 4 is a diagram illustrating a scenario according to some embodiments of the present disclosure.
Figure 5:
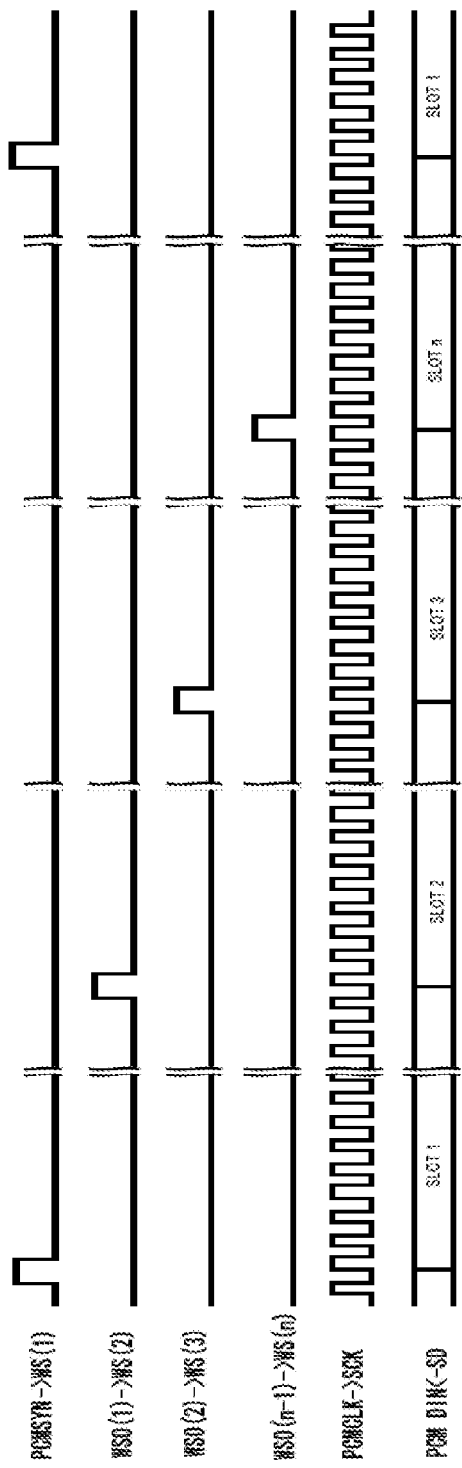
FIG. 5 is a timing diagram of each pin in FIG. 4 according to some embodiments of the present disclosure.

FIG. 4 is a diagram illustrating a scenario according to some embodiments of the present disclosure. FIG. 5 is a timing diagram of each pin in FIG. 4 according to some embodiments of the present disclosure. As shown in FIG. 4 to FIG. 5, in the scenario where ICS-52000 TDM devices are used as peripherals, a PCM controller is used as the controller in the master control chip and a PCM interface is used as the interface, all the TDM devices are cascaded. A PCMSYN pin in the PCM interface is connected with a WS pin of a first-stage TDM device, a PCMCLK pin in the PCM interface is connected with an SCK pin of the TDM device of each stage, and a PCMDIN pin in the PCM interface is connected with an SD pin of the TDM device of each stage. In such a case, timing generated by the PCM controller corresponding to the PCM interface in the master control chip is the timing provided by some embodiments of the present disclosure.

Through the method according to some embodiments of the present disclosure, TDM devices can be connected to the master control chip which adopts the PCM transmission protocol only. Since all the TDM devices are cascaded, pins of the master control chip may be saved, and the complexity and cost of circuit wiring may be reduced. Moreover, a manufacturer of the master control chip may develop a TDM controller based on the original PCM controller and integrate it to the chip.

It is to be noted that the scenario in FIG. 4 is an example only. During the practical application, if TDM devices are output devices, the PCMDOUT pin in the PCM interface may be connected with the SD pin of the TDM device of each stage; and if the TDM devices are output devices as well as input devices, the PCMDOUT pin in the PCM interface may be connected with the data input pin of the TDM device of each stage, and the PCMDIN pin in the PCM interface may be connected with the data output pin of the TDM device of each stage. There are no limits made thereto in the present disclosure.

Figure 6:
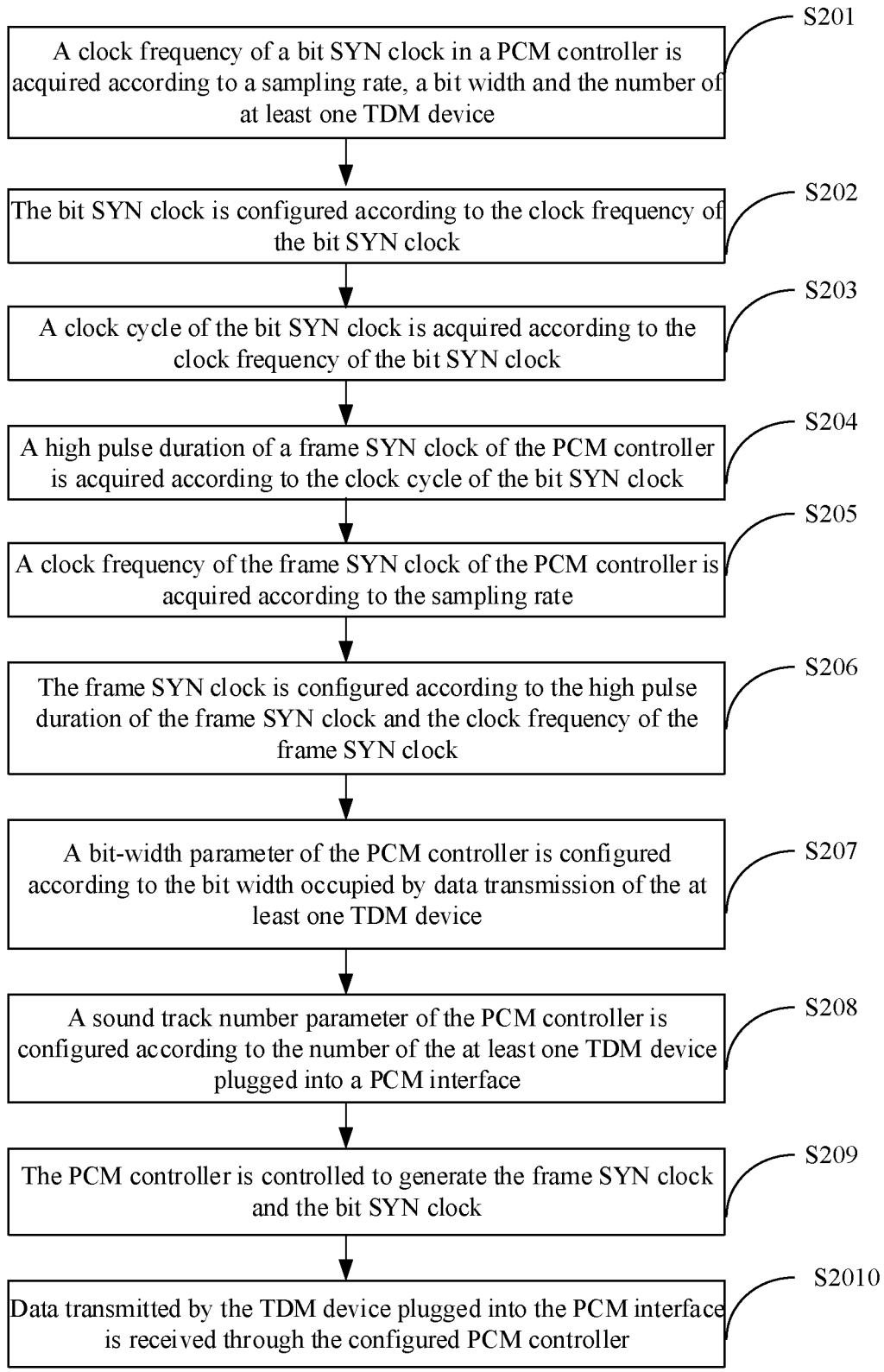
FIG. 6 is a flowchart illustrating a method for configuring a controller in a master control chip according to some embodiments of the present disclosure.

FIG. 6 is a flowchart illustrating a method for configuring a controller in a master control chip according to some embodiments of the present disclosure. As shown in FIG. 6, the method includes the following operations.

In operation S201, a clock frequency of a bit SYN clock of a PCM controller is acquired according to a sampling rate, a bit width and the number of at least one TDM device.

In operation S202, the bit SYN clock is configured according to the clock frequency of the bit SYN clock.

Exemplarily, it is set that the clock frequency of PCMCLK of the PCM controller=the slot bit width*the number of cascaded at least one TDM device*the sampling rate of PCMSYN. The clock frequency of PCMCLK is calculated through the formula, and the PCMCLK is further configured based on the calculated clock frequency of PCMCLK.

In operation S203, a clock cycle of the bit SYN clock is acquired according to the clock frequency of the bit SYN clock.

In operation S204, a high pulse duration of a frame SYN clock of the PCM controller is acquired according to the clock cycle of the bit SYN clock.

In operation S205, a clock frequency of the frame SYN clock of the PCM controller is acquired according to the sampling rate.

It is set that the clock frequency of the PCMSYN of the PCM controller=the sampling rate, i.e., the number of frames of data sampled per second.

In operation S206, the frame SYN clock is configured according to the high pulse duration of the frame SYN clock and the clock frequency of the frame SYN clock.

Since TDM transmission timing is substantially the same as PCM Short Frame SYN Timing, it is necessary to configure that the PCM controller outputs the Short Frame SYN Timing, and in such a case, it is necessary to set that the high pulse duration of PCMSYN of the PCM controller=one PCMCLK cycle. The clock frequency of the bit SYN clock is acquired in the above operations, the cycle of PCMCLK may be acquired based on the clock frequency of PCMCLK accordingly.

In operation S207, a bit-width parameter of the PCM controller is configured according to the bit width occupied by data transmission of the at least one TDM device.

The slot bit width of the PCM controller is set to be a bit width occupied by data transmission of one TDM device.

In operation S208, a parameter of the number of a sound track of the PCM controller is configured according to the number of the at least one TDM device plugged into a PCM interface.

It is set that the number of a PCM slot sound track of the PCM controller=the number of the cascaded at least one TDM device.

In operation S209, the PCM controller is controlled to generate the frame SYN clock and the bit SYN clock.

Since the TDM device cannot generate a clock signal by itself, a master clock mode of the PCM controller is set, namely the PCM controller generates the clocks PCMSYN and PCMCLK for the TDM device to use.

In operation S2010, data transmitted by the at least one TDM device plugged into the PCM interface is received through the configured PCM controller.

In some embodiments of the present disclosure, since Short Frame SYN Timing of PCM transmission timing and the TDM transmission timing are substantially the same and can be compatible, the PCM controller is required to modify the slot bit width, i.e., a bit width occupied by each sampling point, according to requirements of different TDM devices, and the PCM controller is required to adjust the clock PCMCLK according to the number of the cascaded external TDM devices. The clock frequency of PCMCLK=the slot bit width×the number of the cascaded at least one TDM device× the sampling rate of PCMSYN. The clock frequency of PCMSYN=the sampling rate, and a Short Frame mode is adopted, namely the high-level pulse duration of PCMSYN is a PCMCLK cycle. The PCM controller, serving as a master PCM clock, generates the clocks PCMSYN and PCMCLK. The number of slot sound tracks of the PCM controller=the number of the cascaded TDM devices.

A device embodiment of the present disclosure is provided below and may execute the method embodiment of the present disclosure.

Figure 7:
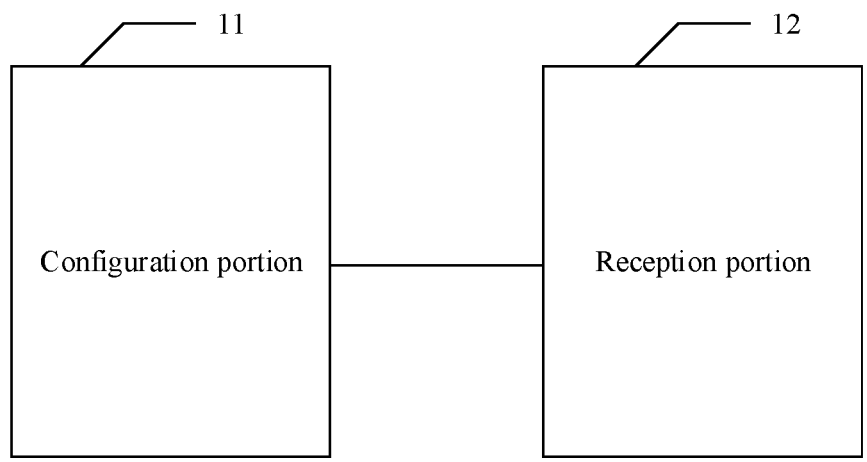
FIG. 7 is a block diagram of a device for configuring a controller in a master control chip according to some embodiments of the present disclosure.

FIG. 7 is a block diagram of a device for configuring a controller in a master control chip according to some embodiments of the present disclosure. As shown in FIG. 7, the device includes:

a configuration portion 11, configured to configure a controller according to a sampling rate, a bit width occupied by data transmission of at least one peripheral and the number of the at least one peripheral plugged into an interface corresponding to the controller; and a reception portion 12, configured to receive data transmitted by the at least one peripheral plugged into the interface through the controller configured by the configuration portion 11.

Figure 8:
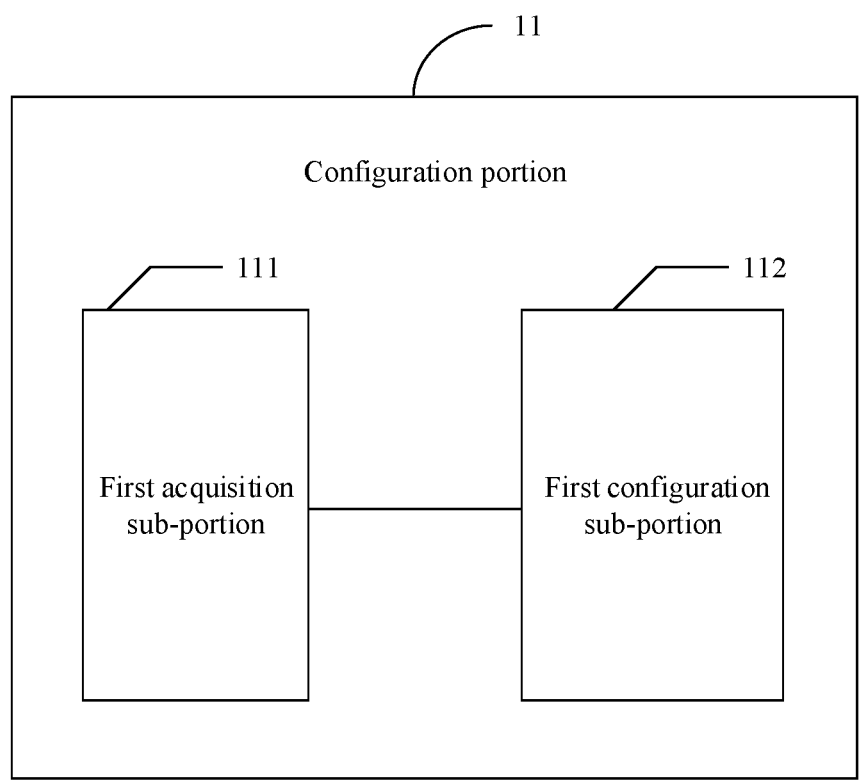
FIG. 8 is a block diagram of a configuration portion in a device for configuring a controller in a master control chip according to some embodiments of the present disclosure.

In an embodiment, as shown in FIG. 8, the configuration portion 11 includes a first acquisition sub-portion 111 and a first configuration sub-portion 112.

The first acquisition sub-portion 111 is configured to acquire a clock frequency of a bit SYN clock of the controller according to the sampling rate, the bit width and the number of the at least one peripheral.

The first configuration sub-portion 112 is configured to configure the bit SYN clock according to the clock frequency, acquired by the first acquisition sub-portion 111, of the bit SYN clock.

Figure 9:
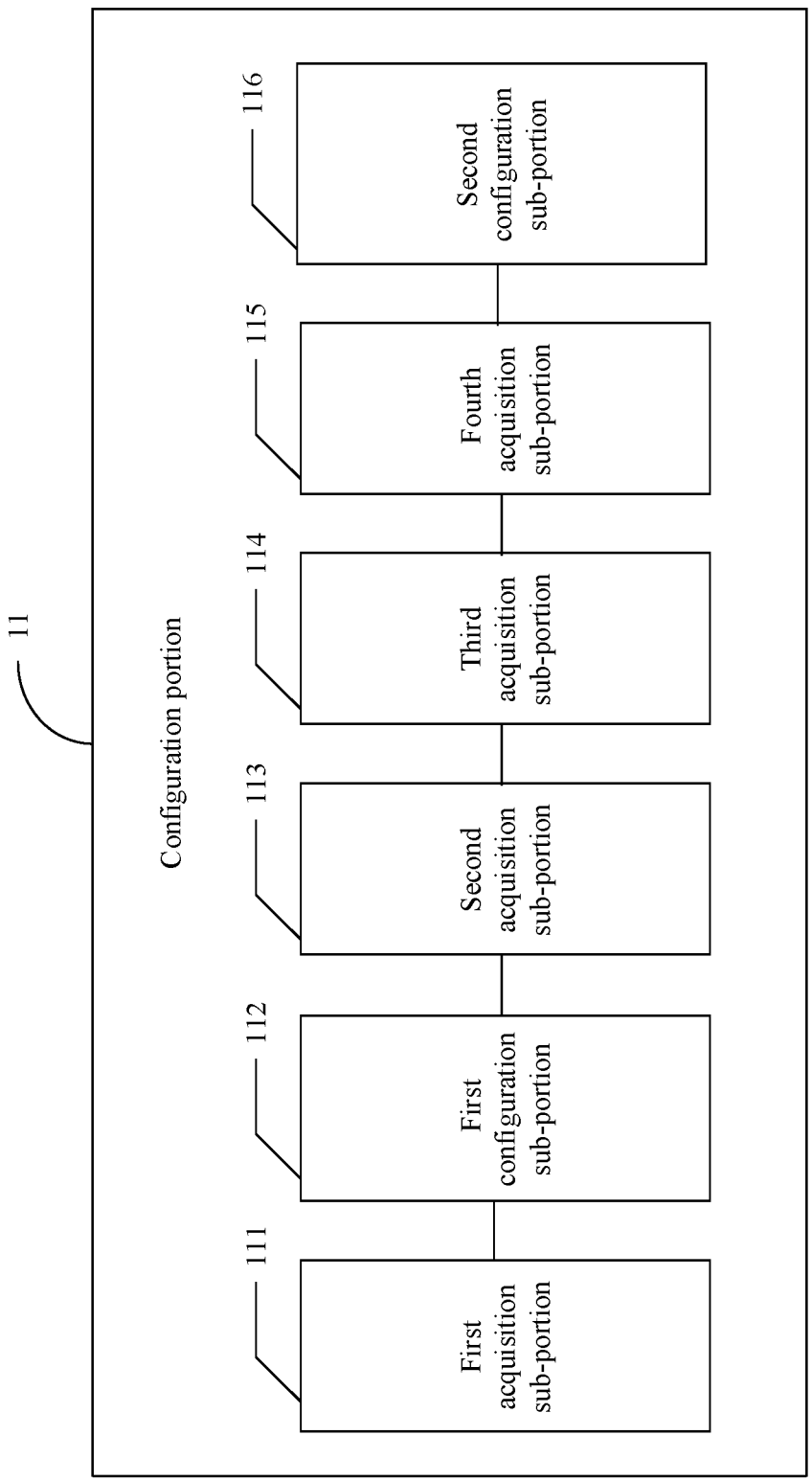
FIG. 9 is a block diagram of a configuration portion in a device for configuring a controller in a master control chip according to some embodiments of the present disclosure.

In an embodiment, as shown in FIG. 9, the configuration portion 11 includes a second acquisition sub-portion 113, a third acquisition sub-portion 114, a fourth acquisition sub-portion 115 and a second configuration sub-portion 116.

The second acquisition sub-portion 113 is configured to acquire a clock cycle of the bit SYN clock according to the clock frequency, acquired by the first acquisition sub-portion 111, of the bit SYN clock.

The third acquisition sub-portion 114 is configured to acquire a high pulse duration of a frame SYN clock of the controller according to the clock cycle, acquired by the second acquisition sub-portion 113, of the bit SYN clock.

The fourth acquisition sub-portion 115 is configured to acquire a clock frequency of the frame SYN clock of the controller according to the sampling rate.

The second configuration sub-portion 116 is configured to configure the frame SYN clock according to the high pulse duration, acquired by the third acquisition sub-portion 114, of the frame SYN clock and the clock frequency, acquired by the fourth acquisition sub-portion 115, of the frame SYN clock.

Figure 10:
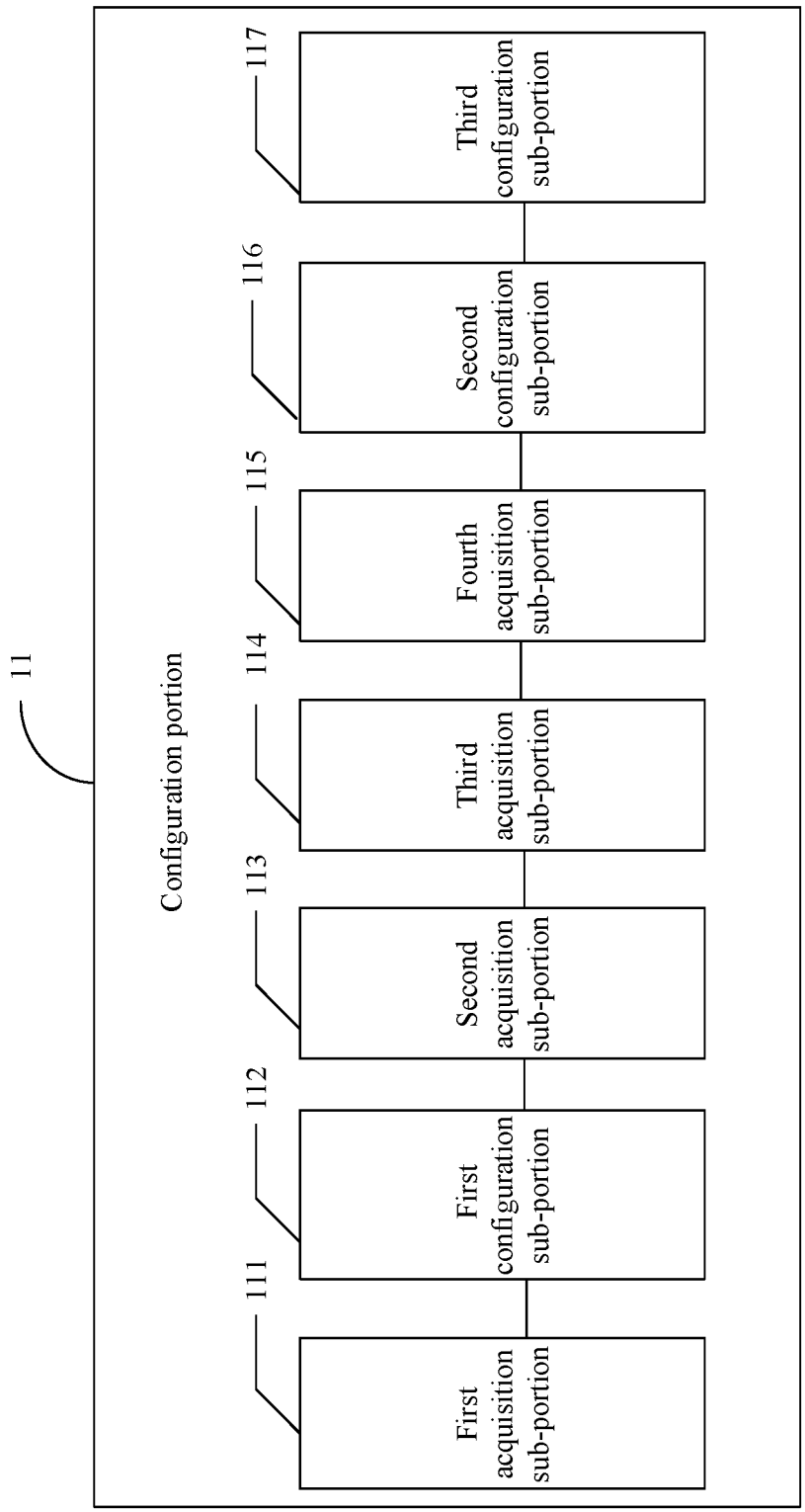
FIG. 10 is a block diagram of a configuration portion in a device for configuring a controller in a master control chip according to some embodiments of the present disclosure.

In an embodiment, as shown in FIG. 10, the configuration portion 11 includes a third configuration sub-portion 117.

The third configuration sub-portion 117 is configured to configure a bit-width parameter of the controller according to the bit width occupied by data transmission of the at least one peripheral.

Figure 11:
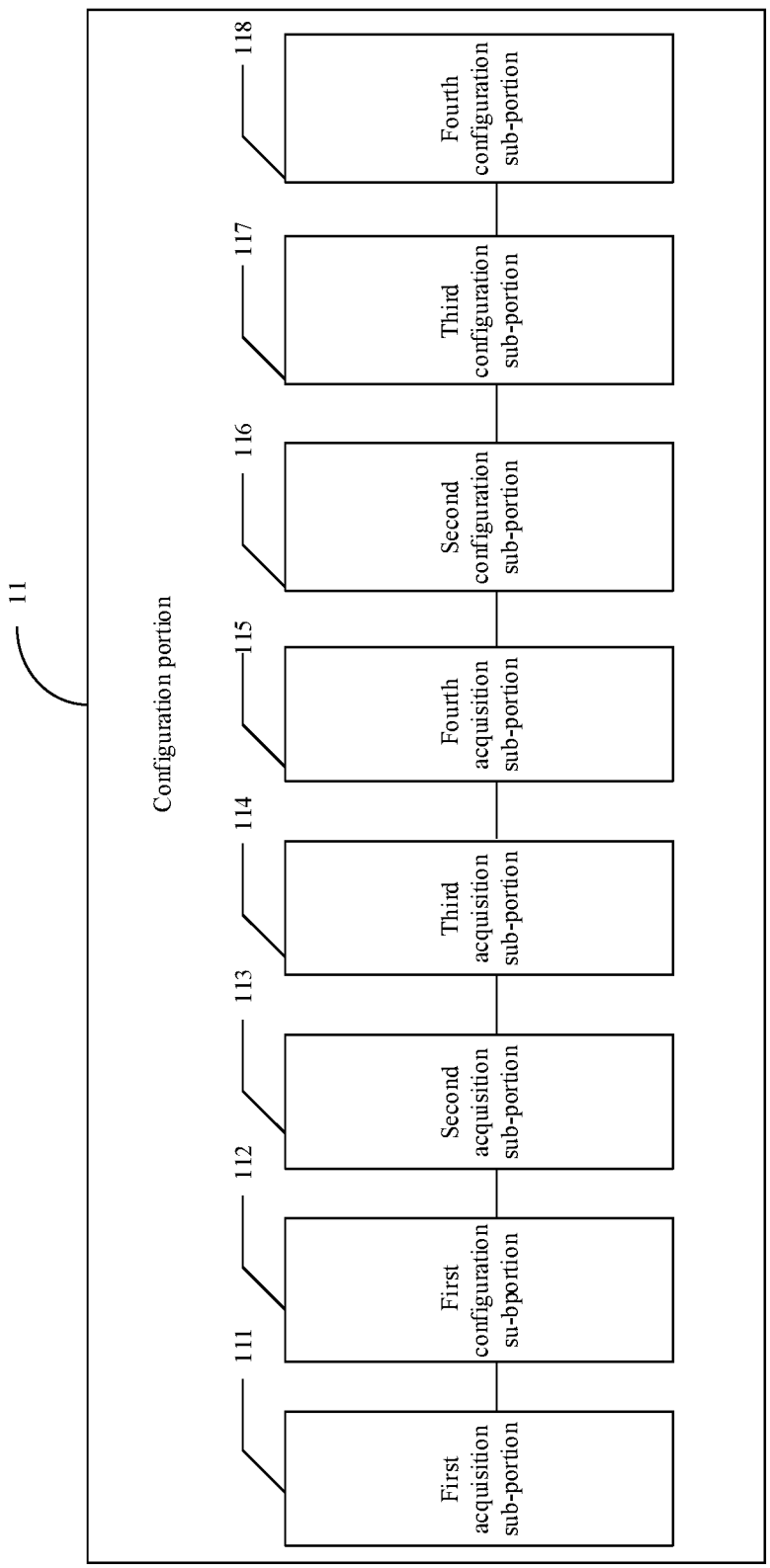
FIG. 11 is a block diagram of a configuration portion in a device for configuring a controller in a master control chip according to some embodiments of the present disclosure.

In an embodiment, as shown in FIG. 11, the configuration portion 11 includes a fourth configuration sub-portion 118.

The fourth configuration sub-portion 118 is configured to configure a parameter of the number of a sound track of the controller according to the number of the at least one peripheral plugged into the interface.

Figure 12:
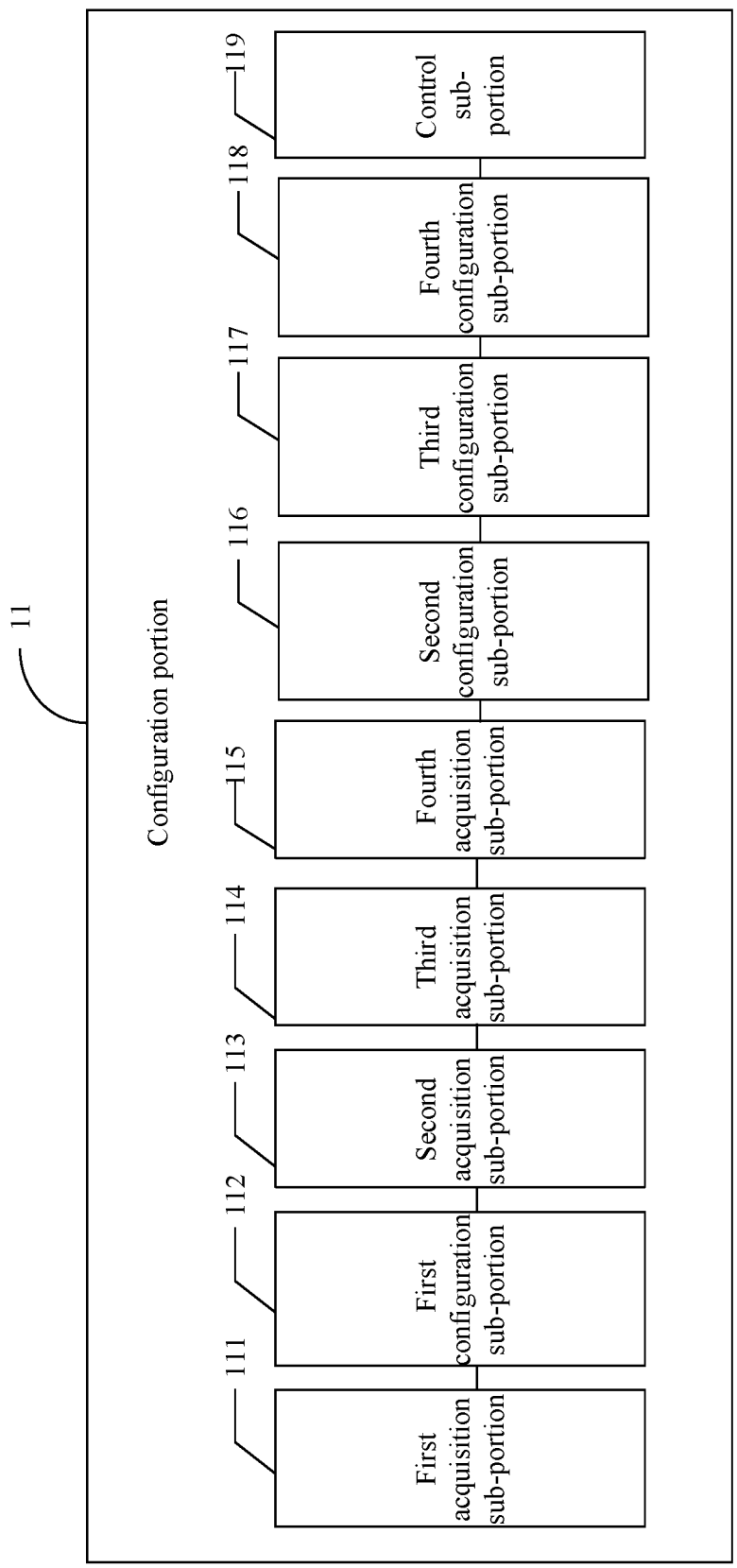
FIG. 12 is a block diagram of a configuration portion in a device for configuring a controller in a master control chip according to some embodiments of the present disclosure.

In an embodiment, as shown in FIG. 12, the device further includes a control sub-portion 119.

The control sub-portion 119 is configured to control the controller to generate the frame SYN clock and the bit SYN clock.

In an embodiment, the controller may include a PCM controller; and the peripheral may include a TDM device.

According to a third aspect of the embodiments of the present disclosure, a device for configuring a controller in a master control chip is provided, which includes:

a processor; and a memory configured to store an instruction executable by the processor, wherein the processor is configured to:

configure a controller according to a sampling rate, a bit width occupied by data transmission of at least one peripheral and the number of the at least one peripheral plugged into an interface corresponding to the controller; and control a transceiver to receive data transmitted by the at least one peripheral plugged into the interface through the configured controller.

The processor may further be configured to execute operations as follows.

For the operation that the controller is configured according to the sampling rate, the bit width occupied by data transmission of the at least one peripheral and the number of the at least one peripheral plugged into the interface corresponding to the controller, the processor may be further configured to:

acquire a clock frequency of a bit SYN clock of the controller according to the sampling rate, the bit width and the number of the at least one peripheral; and configuring the bit SYN clock according to the clock frequency of the bit SYN clock.

For the operation that the controller is configured according to the sampling rate, the bit width occupied by data transmission of the at least one peripheral and the number of the at least one peripheral plugged into the interface corresponding to the controller, the processor may be further configured to:

acquire a clock cycle of the bit SYN clock according to the clock frequency of the bit SYN clock;

acquire a high pulse duration of a frame SYN clock of the controller according to the clock cycle of the bit SYN clock;

acquire a clock frequency of the frame SYN clock of the controller according to the sampling rate; and configure the frame SYN clock according to the high pulse duration of the frame SYN clock and the clock frequency of the frame SYN clock.

For the operation that the controller is configured according to the sampling rate, the bit width occupied by data transmission of the at least one peripheral and the number of the at least one peripheral plugged into the interface corresponding to the controller, the processor may be further configured to:

configure a bit-width parameter of the controller according to the bit width occupied by data transmission of the at least one peripheral.

For the operation that the controller is configured according to the sampling rate, the bit width occupied by data transmission of the at least one peripheral and the number of the at least one peripheral plugged into the interface corresponding to the controller, the processor may be further configured to:

configure a parameter of the number of a sound track of the controller according to the number of the at least one peripheral plugged into the interface.

The processor may be further configured to:

control the controller to generate the frame SYN clock and the bit SYN clock.

The controller may include a PCM controller; and the peripheral may include a TDM device.

With respect to the device in the above embodiment, the specific manners for performing operations of individual portions therein have been described in detail in the embodiment of the method, which will not be elaborated herein.

Figure 13:
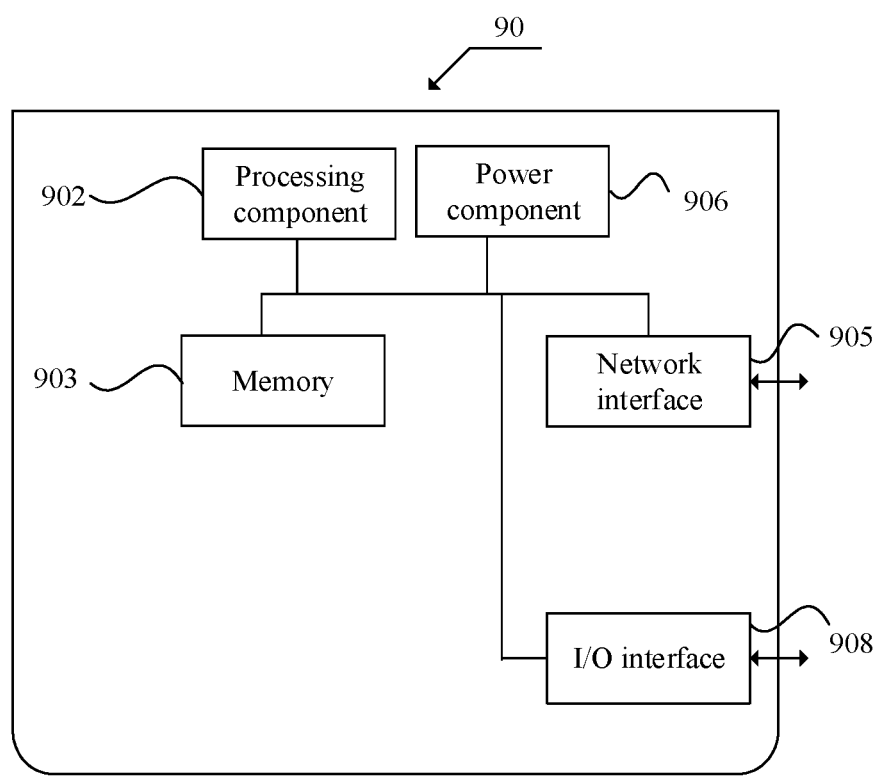
FIG. 13 is a block diagram of a device 90 for configuring a controller in a master control chip according to some embodiments of the present disclosure.

FIG. 13 is a block diagram of a device 90 for configuring a controller in a master control chip according to some embodiments of the present disclosure. For example, the device 90 may act as a server. The device 90 may include: a processing component 902 which may further include one or more processors; and a memory resource represented by a memory 903, configured to store an instruction executable by the processing component 902, for example, an application. The application stored in the memory 903 may include one or more than one portion, each of which corresponds to a set of instructions. In addition, the processing component 902 is configured to execute the instruction to execute the abovementioned method.

The device 90 may further include a power component 906 configured to execute power management of the device 90, a wired or wireless network interface 905 configured to connect the device 90 to a network and an Input/Output (I/O) interface 908. The device 90 may be operated based on an operating system stored in the memory 903, for example, Windows Server™, Max OS X™, Unix™, Linux™, FreeBSD™ or the like.

According to a non-transitory computer-readable storage medium can have instructions stored thereon for execution by the processor of the device 90 to enable the device 90 to implement the method for configuring a controller in the master control chip, the method including that:

a controller is configured according to a sampling rate, a bit width occupied by data transmission of at least one peripheral and the number of the at least one peripheral plugged into an interface corresponding to the controller; and data transmitted by the at least one peripheral plugged into the interface is received through the configured controller.

The operation that the controller is configured according to the sampling rate, the bit width occupied by data transmission of the at least one peripheral and the number of the at least one peripheral plugged into the interface corresponding to the controller may include that:

a clock frequency of a bit SYN clock of the controller is acquired according to the sampling rate, the bit width and the number of the at least one peripheral; and the bit SYN clock is configured according to the clock frequency of the bit SYN clock.

The operation that the controller is configured according to the sampling rate, the bit width occupied by data transmission of the at least one peripheral and the number of the at least one peripheral plugged into the interface corresponding to the controller may include that:

a clock cycle of the bit SYN clock is acquired according to the clock frequency of the bit SYN clock;

a high pulse duration of a frame SYN clock of the controller is acquired according to the clock cycle of the bit SYN clock;

a clock frequency of the frame SYN clock of the controller is acquired according to the sampling rate; and the frame SYN clock is configured according to the high pulse duration of the frame SYN clock and the clock frequency of the frame SYN clock.

The operation that the controller is configured according to the sampling rate, the bit width occupied by data transmission of the at least one peripheral and the number of the at least one peripheral plugged into the interface corresponding to the controller may include that:

a bit-width parameter of the controller is configured according to the bit width occupied by data transmission of the at least one peripheral.

The operation that the controller is configured according to the sampling rate, the bit width occupied by data transmission of the at least one peripheral and the number of the at least one peripheral plugged into the interface corresponding to the controller may include that:

a parameter of the number of a sound track of the controller is configured according to the number of the at least one peripheral plugged into the interface.

The method further may include that:

the controller is controlled to generate the frame SYN clock and the bit SYN clock.

The controller may include a PCM controller; and the peripheral may include a TDM device.

In some embodiments of the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example.

In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for configuring a controller in a master control chip, comprising:
   configuring a controller according to a sampling rate, a bit width occupied by data transmission of at least one peripheral and the number of the at least one peripheral plugged into an interface corresponding to the controller; and
   receiving data transmitted by the at least one peripheral plugged into the interface through the controller based on a Pulse Code Modulation (PCM) transmission protocol that corresponds to the controller and is compatible with a Time Division Multiplexing (TDM) transmission protocol corresponding to the at least one peripheral,
   wherein PCM timing is generated by the controller and is timing for connecting the at least one peripheral corresponding to the TDM transmission protocol, a configuration parameter of the PCM timing is associated with the sampling rate, the bit width occupied by data transmission of the at least one peripheral and the number of the at least one peripheral plugged into the interface corresponding to the controller.

2. The method of claim 1, wherein the configuring the controller according to the sampling rate, the bit width occupied by data transmission of the at least one peripheral and the number of the at least one peripheral plugged into the interface corresponding to the controller comprises:
   acquiring a clock frequency of a bit Synchronization (SYN) clock of the controller according to the sampling rate, the bit width and the number of the at least one peripheral; and
   configuring the bit SYN clock according to the clock frequency.

3. The method of claim 2, wherein the configuring the controller according to the sampling rate, the bit width occupied by data transmission of the at least one peripheral and the number of the at least one peripheral plugged into the interface corresponding to the controller comprises:
   acquiring a clock cycle of the bit SYN clock according to the clock frequency of the bit SYN clock;
   acquiring a high pulse duration of a frame SYN clock of the controller according to the clock cycle of the bit SYN clock;
   acquiring a clock frequency of the frame SYN clock of the controller according to the sampling rate; and
   configuring the frame SYN clock according to the high pulse duration of the frame SYN clock and the clock frequency of the frame SYN clock.

4. The method of claim 1, wherein the configuring the controller according to the sampling rate, the bit width occupied by data transmission of the at least one peripheral and the number of the at least one peripheral plugged into the interface corresponding to the controller comprises:
   configuring a bit-width parameter of the controller according to the bit width occupied by data transmission of the at least one peripheral.

5. The method of claim 1, wherein the configuring the controller according to the sampling rate, the bit width occupied by data transmission of the at least one peripheral and the number of the at least one peripheral plugged into the interface corresponding to the controller comprises:
   configuring a parameter of the number of a sound track of the controller according to the number of the at least one peripheral plugged into the interface.

6. The method of claim 3, further comprising:
   controlling the controller to generate the frame SYN clock and the bit SYN clock.

7. The method of claim 1, wherein the controller comprises a Pulse Code Modulation (PCM) controller; and the peripheral comprises a Time Division Multiplexing (TDM) device.

8. A device for configuring a controller in a master control chip, comprising:
   a processor; and memory configured to store an instruction executable by the processor, wherein the processor is configured to:

configure a controller according to a sampling rate, a bit width occupied by data transmission of at least one peripheral and the number of the at least one peripheral plugged into an interface corresponding to the controller; and control a transceiver to receive data transmitted by the at least one peripheral plugged into the interface through the configured controller based on a Pulse Code Modulation (PCM) transmission protocol that corresponds to the controller and is compatible with a Time Division Multiplexing (TDM) transmission protocol corresponding to the at least one peripheral, wherein PCM timing is generated by the controller and is timing for connecting the at least one peripheral corresponding to the TDM transmission protocol, a configuration parameter of the PCM timing is associated with the sampling rate, the bit width occupied by data transmission of the at least one peripheral and the number of the at least one peripheral plugged into the interface corresponding to the controller.

9. The device of claim 8, wherein the processor is further configured to:

acquire a clock frequency of a bit Synchronization (SYN) clock of the controller according to the sampling rate, the bit width and the number of the at least one peripheral; and configure the bit SYN clock according to the clock frequency of the bit SYN clock.

10. The device of claim 9, wherein the processor is further configured to:

acquire a clock cycle of the bit SYN clock according to the clock frequency of the bit SYN clock;

acquire a high pulse duration of a frame SYN clock of the controller according to the clock cycle of the bit SYN clock;

acquire a clock frequency of the frame SYN clock of the controller according to the sampling rate; and configure the frame SYN clock according to the high pulse duration of the frame SYN clock and the clock frequency of the frame SYN clock.

11. The device of claim 8, wherein the processor is further configured to configure a bit-width parameter of the controller according to the bit width occupied by data transmission of the at least one peripheral.

12. The device of claim 8, wherein the processor is configured to configure a parameter of the number of a sound track of the controller according to the number of the at least one peripheral plugged into the interface.

13. The device of claim 10, wherein the processor is configured to:

control the controller to generate the frame SYN clock and the bit SYN clock.

14. The device of claim 8, wherein the controller comprises a Pulse Code Modulation (PCM) controller; and the peripheral comprises a Time Division Multiplexing (TDM) device.

15. A device for configuring a controller in a master control chip, comprising:

the master control chip; and

N cascaded peripherals, N being a positive integer more than or equal to 1, wherein a frame Synchronization (SYN) clock pin in the master control chip is connected with a wakeup signal pin of a first-stage peripheral, the first-stage peripheral being one of the N peripherals;

a bit SYN clock pin in the master control chip is connected with a bit SYN signal pin of the first-stage peripheral; and an audio data transmission pin in the master control chip is connected with a data transmission pin of the first-stage peripheral, wherein the master control chip has a Pulse Code Modulation (PCM) transmission interface, and at least one of the N cascaded peripherals has a Time Division Multiplexing (TDM) transmission interface compatible with the PCM transmission interface, wherein PCM timing is generated by the controller and is timing for connecting the at least one of the N cascaded peripherals, a configuration parameter of the PCM timing is associated with a sampling rate, a bit width occupied by data transmission of the at least one of the N cascaded peripherals and the number of the at least one of the N cascaded peripherals plugged into the PCM transmission interface.

16. The device of claim 15, wherein an audio data output pin in the master control chip is connected with a data input pin of the first-stage peripheral; and an audio data input pin in the master control chip is connected with a data output pin of the first-stage peripheral.

17. The device of claim 16, wherein for the N cascaded peripherals, a data transmission completion indication signal pin of a previous-stage peripheral is connected with a wakeup signal pin of a next-stage peripheral of the previous-stage peripheral;

a bit SYN signal pin of a peripheral of each stage is connected with the bit SYN clock pin in the master control chip; and a data transmission pin of the peripheral of each stage is connected with a data transmission pin in the master control chip.

18. The device of claim 15, wherein the controller in the master control chip comprises a PCM controller.

19. A computer-readable storage medium, having instructions stored thereon for execution by a processor of a terminal to enable the terminal to implement the operations of the method of claim 1.

20. An apparatus implementing the method according to claim 1, comprising:

the master control chip; and

N cascaded peripherals, N being a positive integer more than or equal to 1, wherein a frame Synchronization (SYN) clock pin in the master control chip is connected with a wakeup signal pin of a first-stage peripheral, the first-stage peripheral being one of the N peripherals;

a bit SYN clock pin in the master control chip is connected with a bit SYN signal pin of the first-stage peripheral; and an audio data transmission pin in the master control chip is connected with a data transmission pin of the first-stage peripheral;

wherein configuration parameter of the controller is reconfigured, such that the N cascaded peripherals are capable of being connected to the interface at timing generated by the controller and the data transmitted by the N cascaded peripherals are acquired, such that types of the N cascaded peripherals supported by the master control chip are extended, and N is effectively increased.

\* \* \* \* \*